Patented Aug. 29, 1944

2,356,974

UNITED STATES PATENT OFFICE 2,356,974

DIENE INTERPOLYMERS AND METHOD OF PREPARING THE SAME

Albert M. Clifford, Stow, Ohio, assignor to Wingfoot Corporation, Akron, Ohio, a corporation of Delaware No Drawing. Application April 30, 1943, Serial No. 485,155

19 Claims. (Cl. 260—86.5)

This invention relates to polymerization products and to a method of preparing the same. More particularly, it relates to copolymers or interpolymers of a diene compound and a substituted styrene compound.

Plastic masses have heretofore been prepared by the interpolymerization of butadiene and styrene or alpha alkyl-substituted styrenes; also from acrylic compounds and styrene, methyl styrene or chloro styrene. It has now been found that useful plastic materials may be secured by the interpolymerization of a diene compound, especially butadiene compounds, and an alkoxy-substituted styrene or other alkoxy-substituted aryl vinyl compound. For example, plastic masses are prepared, in accordance with the terms of the invention, by copolymerizing or interpolymerizing a butadiene-1,3 and para methoxy styrene. The polymerization is carried out according to any of the methods of polymerization known in the art, as in aqueous emulsion or by mass polymerization accomplished by heating in the presence of an oxidant, such as a peroxide, and a solvent for the reagents, if desired.

In the emulsion polymerization, a mixture of the monomers is emulsified in water containing a suitable emulsifying agent and an oxidant, at a temperature between about 20° and 80° C. The emulsion is continuously agitated during the reaction and may require a period of time from several hours to several days for completion, or in order to reach the desired stage of polymerization. Other ingredients may be present in the emulsion in addition to the emulsifier and the oxidant, as will appear hereinafter.

Thus the emulsifier may be a soap such as a sodium or potassium salt of a saturated or an unsaturated fatty acid, e. g., sodium palmitate or sodium oleate; or synthetic soap-like materials, such as aromatic sulfates or sulfonates and salts of high molecular weight aliphatic bases, e. g., sodium lauryl sulfate and sodium naphthalene sulfonate.

The oxidant employed may be a peroxide such as hydrogen peroxide or benzoyl peroxide, or a salt which generates hydrogen peroxide, such as sodium perborate or sodium persulfate.

In order to illustrate the invention the following example is given, but it will be understood that the same is illustrative and that no limitation is intended thereby.

A test batch for polymerization was made up having the following composition:

| | | |
|---|---|---|
| 5% Aquarex D solution (sodium lauryl sulfate) | cc | 10 |
| Phosphate-citrate buffer solution | cc | 10 |
| Sodium perborate | g | 0.133 |
| Carbon tetrachloride | g | 0.48 |
| Para methoxy styrene | g | 6.4 |
| Butadiene-1,3 | g | 9.6 |

Five batches were polymerized in varying hydrogen-ion concentrations of the emulsion, the temperature being 50° C. and the time elapsed fifteen days. The emulsions were continuously agitated during this period. At the end of that time, the latices obtained were coagulated and weighed. The results obtained follow:

*p-Methoxy styrene—butadiene-1,3*

| Buffer pH | Grams | Per cent yield |
|---|---|---|
| 4.7 | 2.50 | 15.7 |
| 5.8 | 7.33 | 45.75 |
| 7.92 | 12.00 | 75.00 |
| H₂O | 10.28 | 64.2 |

It will be noted that each of the copolymers was prepared from a butadiene-para methoxy styrene monomeric mixture in which these ingredients were present in 60:40 ratio. Of course, other proportions may be used over a wide range, although rubber-like properties are more likely to be obtained when the butadiene or other conjugated diene compound is present to the extent of 50% to 80% and the olefin-substituted aromatic ether from about 20% to 50%, by weight. Increase of the alkoxy styrene constituent tends to give products which are tougher, more thermoplastic and more difficult to vulcanize; it may be present to the extent of at least 20% by weight of the mixture.

While the invention has been described more particularly with regard to para methoxy styrene and butadiene-1,3, it includes within its scope copolymers of other alkoxy styrenes, such as ortho, meta, or para methoxy, ethoxy, propoxy, and isopropoxy-substituted styrenes. Also included are the alkoxy-substituted vinyl naphthalenes; the aryloxy-substituted aryl olefins including naphthoxy and phenoxy compounds such as para phenoxy styrene; compounds which contain a methylene or ethylene or, in general, an alkyleen dioxy radical linked to the olefinic aryl group, such as 1-vinyl, 3,4 methylene dioxy benzene; and compounds containing alkyl substituents in the olefinic side chain of the aromatic ether, such as 1-isopropenyl-4-methoxy benzene (anethole); as well as other compounds of similar nature. However, the preferred compounds for the purposes of the invention are the alkoxy-substituted aryl olefins, particularly the vinyl benzenes which contain less than five carbon atoms in the alkoxy group.

The other constituent of the copolymers is a conjugated diene hydrocarbon, such as butadiene-1,3; isoprene; 2,3-dimethyl butadiene-1,3; and piperylene; of these butadiene-1,3 is preferred.

In general, then, it may be said that the copolymers of the invention comprise a conjugated diene hydrocarbon polymerized with an aromatic ether containing a polymerizable olefinic side chain connected to the aromatic nucleus. The term aromatic ether is used in its broad sense to refer to compounds containing an aromatic radical connected by the ether linkage —O—, to another radical of either the aromatic, aliphatic, or cyclic series.

These monomers which are copolymerized with dienes according to this invention, may be prepared in any of a number of ways such as by the reaction of alkylated phenols with olefin halides in the presence of an aluminum chloride catalyst or they may be obtained from natural sources. Mixtures of olefin-substituted aromatic ethers such as a mixture of o, m and p-methoxy styrene may be used in place of the pure compounds if desired. However, it is important that the olefin substituted aromatic ethers contain no phenolic substituents or phenolic impurities since these compounds inhibit the polymerization reaction.

It is also within the scope of this invention to include other diene comonomers such as acrylonitrile, styrenes, methyl methacrylate, vinylidene chloride and the like with the mixture of the diene and the olefin-substituted aromatic ether before polymerization, if desired.

As indicated, the products of the invention are useful as rubber substitutes and may be used in the manufacture of articles heretofore made of rubber, as well as others. The composition may be compounded with other materials, such as pigments, plasticizers, vulcanization ingredients, age-resistors and the like.

Where the olefin-substituted aromatic ether is present to the extent of about 60% or more by weight, the products are tougher, more thermoplastic, and more difficult to vulcanize. The rubber-like properties are not so pronounced and the products are more adapted for use as molding plastics, for coating fabrics, and for a number of similar purposes.

While there have been described above the preferred embodiments of the invention, it will be apparent to those skilled in the art that various modifications and changes may be made therein without departing from the spirit of the invention or from the scope of the appended claims.

I claim:

1. The process which comprises copolymerizing a mixture of comonomers including an aliphatic conjugated diene hydrocarbon and an aromatic compound containing an ether oxygen atom directly connected to a carbon atom in the aromatic nucleus and also containing a polymerizable olefine side chain directly connected to another carbon atom in the aromatic nucleus.

2. The process which comprises copolymerizing a mixture of comonomers including an aliphatic conjugated diene hydrocarbon and an alkoxy-substituted aryl olefin wherein the alkoxy substituent is directly connected to a ring carbon atom in the aryl group.

3. The process which comprises copolymerizing a mixture of comonomers including an aliphatic conjugated diene hydrocarbon and an alkoxy-substituted aryl olefin wherein the alkoxy substituent is directly connected to a ring carbon atom in the aryl group and contains not more than five carbon atoms.

4. The process which comprises polymerizing a mixture of comonomers including an aliphatic conjugated diene hydrocarbon and an alkoxy-substituted vinyl benzene wherein the alkoxy substituent is directly connected to a carbon atom in the benzene ring and contains not more than five carbon atoms.

5. The process which comprises copolymerizing a mixture of comonomers including butadiene and p-methoxy styrene.

6. The process which comprises copolymerizing in aqueous emulsion a mixture of comonomers including butadiene and an alkoxy-substituted aryl olefin wherein the alkoxy substituent is directly connected to a ring carbon atom in the aryl group.

7. The process which comprises copolymerizing in aqueous emulsion a mixture of comonomers including butadiene and p-methoxy styrene said mixture containing at least 50% by weight of butadiene.

8. The process which comprises copolymerizing in aqueous emulsion a mixture of comonomers including butadiene and an alkoxy-substituted aryl olefin wherein the alkoxy substituent is directly connected to a ring carbon atom in the aryl group and contains not more than five carbon atoms, said mixture containing at least 50% by weight of butadiene.

9. A copolymer of an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

10. A copolymer of an aliphatic conjugated diene hydrocarbon and an alkoxy-substituted aryl olefin wherein the alkoxy substituent is directly connected to a ring carbon atom in the aryl group.

11. A copolymer of an aliphatic conjugated diene hydrocarbon and an alkoxy-substituted aryl olefin wherein the alkoxy substituent is directly connected to a ring carbon atom in the aryl group and contains not more than five carbon atoms.

12. A copolymer of an aliphatic conjugated diene hydrocarbon and an alkoxy-substituted vinyl benzene wherein the alkoxy substituent is directly connected to a carbon atom in the benzene ring and contains not more than five carbon atoms.

13. A copolymer of butadiene and p-methoxy styrene.

14. An elastic, vulcanizable copolymer of an aliphatic conjugated diene hydrocarbon and an aromatic compound containing an ether oxygen atom directly connected to a carbon atom in the aromatic nucleus and also containing a polymerizable olefinic side side chain directly connected to another carbon atom in the aromatic nucleus.

15. An elastic, vulcanizable copolymer of an aliphatic conjugated diene hydrocarbon and an alkoxy-substituted aryl olefin wherein the alkoxy substituent is directly connected to a ring carbon atom in the aryl group.

16. An elastic vulcanizable copolymer of butadiene and an alkoxy-substituted aryl olefin wherein the alkoxy substituent is directly connected to a ring carbon atom in the aryl group and contains not more than five carbon atoms.

17. An elastic vulcanizable copolymer of butadiene and p-methoxy styrene.

18. The process which comprises copolymerizing in aqueous emulsion a mixture of comonomers including an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus.

19. The process which comprises copolymerizing a mixture of comonomers including an aliphatic conjugated diene hydrocarbon and an aromatic compound containing an ether oxygen atom directly connected to a carbon atom in the aromatic nucleus and also containing a polymerizable olefinic side chain directly connected to another carbon atom in the aromatic nucleus, said mixture containing at least 50% by weight of said diene hydrocarbon and at least 20% by weight of said aromatic compound.

ALBERT M. CLIFFORD.